United States Patent
Abee

(10) Patent No.: US 9,859,654 B1
(45) Date of Patent: Jan. 2, 2018

(54) EJECTOR MECHANISM FOR ELECTRICAL ASSEMBLY

(71) Applicant: Eaton Corporation, Cleveland, OH (US)

(72) Inventor: Brandon Matthew Abee, Fletcher, NC (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 15/333,697

(22) Filed: Oct. 25, 2016

(51) Int. Cl.
| | |
|---|---|
| *H01R 13/62* | (2006.01) |
| *H01R 13/635* | (2006.01) |
| *H01R 13/73* | (2006.01) |

(52) U.S. Cl.
CPC ........... *H01R 13/635* (2013.01); *H01R 13/73* (2013.01)

(58) Field of Classification Search
CPC ............... H01R 13/635; H01R 13/633; H01R 13/6335; H01R 23/7005; H01R 23/7068; H05K 5/0295; H05K 7/1409; H06K 13/08; H06K 13/0806
USPC ............ 439/160, 159, 157; 200/50.21, 50.23
See application file for complete search history.

(56) References Cited

U.S. PATENT DOCUMENTS

| | | | | |
|---|---|---|---|---|
| 3,566,343 A | * | 2/1971 | Kinkaid ................. | H01R 13/41 439/389 |
| 4,509,810 A | * | 4/1985 | Erlam .................. | H05K 7/1421 361/726 |
| 5,147,975 A | * | 9/1992 | Munach .................... | F42C 1/14 102/254 |
| 5,333,097 A | * | 7/1994 | Christensen ......... | G11B 33/126 361/679.35 |
| 5,564,933 A | * | 10/1996 | Bouchan .............. | G06K 7/0047 235/492 |
| 5,669,512 A | * | 9/1997 | Joslin ................... | H05K 7/1409 211/41.17 |
| 5,791,920 A | * | 8/1998 | Tomioka ............ | G06K 13/0806 439/159 |
| 5,793,614 A | * | 8/1998 | Tollbom ............... | H05K 7/1409 361/725 |
| 5,825,616 A | * | 10/1998 | Howell ................. | G06F 1/1616 361/679.38 |
| 6,134,115 A | * | 10/2000 | Sim ........................ | G06F 1/184 292/336.3 |

(Continued)

OTHER PUBLICATIONS

*Motor Control (AMPGARD)—Medium Voltage*, Sheet 10001, Eaton Corporation (Nov. 2015) 84 pages.

*Primary Examiner* — Abdullah Riyami
*Assistant Examiner* — Vladimir Imas
(74) *Attorney, Agent, or Firm* — Ward and Smith, P.A.

(57) ABSTRACT

An apparatus includes an electrical assembly (e.g., a contactor) configured to be inserted into an enclosure. The electrical assembly includes at least one first contact configured to mate with at least one second contact disposed in an enclosure when the contactor assembly is inserted in the enclosure. The apparatus further includes an ejector mechanism including at least one pivoting member attached to the electrical assembly and configured to pivot about a point of attachment to the electrical assembly to apply a force to a surface of the enclosure and thereby cause movement of the electrical assembly within the enclosure. The movement of the electrical assembly caused by the ejector mechanism may disengage the at least one first contact from the at least one second contact. The electrical assembly may include a wheeled undercarriage and the at least one pivoting member may be attached to the undercarriage.

18 Claims, 6 Drawing Sheets

(56) References Cited

U.S. PATENT DOCUMENTS

| | | | | |
|---|---|---|---|---|
| 6,185,106 B1* | 2/2001 | Mueller | H05K 7/1409 | 361/754 |
| 6,410,844 B1* | 6/2002 | Bruner | H02B 13/025 | 174/17 VA |
| 6,538,972 B1* | 3/2003 | Poulsen | G06F 1/1632 | 361/679.01 |
| 6,793,536 B2* | 9/2004 | Takeyama | H01R 11/05 | 439/631 |
| 6,891,728 B1* | 5/2005 | Mease | G06F 1/183 | 312/333 |
| 7,245,499 B2* | 7/2007 | Stahl | H05K 7/1409 | 361/610 |
| 7,252,521 B2* | 8/2007 | Song | H05K 7/1409 | 439/160 |
| 7,292,457 B2* | 11/2007 | DeNies | H05K 7/1461 | 361/759 |
| 7,349,228 B1* | 3/2008 | Ray | H05K 7/1409 | 361/798 |
| 7,408,789 B2* | 8/2008 | Tao | G06F 1/186 | 361/726 |
| 7,503,800 B2* | 3/2009 | Siglock | H01R 4/36 | 439/517 |
| 7,510,416 B2* | 3/2009 | Sato | H05K 7/1409 | 361/754 |
| 7,679,933 B2* | 3/2010 | Makabe | G06F 1/185 | 174/365 |
| 7,685,613 B2* | 3/2010 | Permut | G11B 33/022 | 361/679.38 |
| 7,865,210 B2* | 1/2011 | Wang | H04M 1/026 | 439/153 |
| 7,866,995 B1* | 1/2011 | Kudo | H01R 12/721 | 439/157 |
| 7,995,347 B1* | 8/2011 | Otte | H05K 7/1409 | 312/223.1 |
| 8,113,863 B2* | 2/2012 | Vrenna | H01R 12/721 | 439/327 |
| 8,116,102 B2* | 2/2012 | Wong | H01L 23/24 | 174/529 |
| 8,325,487 B2* | 12/2012 | Yamaguchi | H05K 7/1489 | 361/752 |
| 9,015,931 B2* | 4/2015 | Boetzer | H05K 7/1409 | 29/750 |

\* cited by examiner

EJECTOR MECHANISM FOR ELECTRICAL ASSEMBLY

BACKGROUND

The inventive subject matter relates to electrical apparatus and, more particularly, to electrical apparatus that install in enclosures with frictional electrical connections.

Electrical equipment, such as motor drives and starters, may include electrical assemblies, such as circuit breakers, contactors, and other switching devices that are configured to be removably installed in an enclosure. For example, a motor starter may employ a contactor assembly that is carried by a wheeled undercarriage that facilitates insertion of the contactor assembly into an enclosure. The contactor assembly may employ frictional electrical connections, such as spring loaded contacts or "stabs" that are designed to frictionally engage bus bars in the enclosure when the assembly is installed. Examples of such contactor assemblies are illustrated in a data sheet *Motor Control (AMP-GARD)-Medium Voltage*, Sheet 10001, Eaton Corporation (November 2015).

Removal of such an assembly from an enclosure may require considerable force. In particular, the electrical connections may require significant disengagement force due to the number of connections (e.g., three input and three output phases) and the frictional forces generated between the contacts and the bus bars. Conventionally, personnel extracting such a contactor assembly from an enclosure may employ a pry bar to force movement of the contactor assembly and disengagement of the contacts.

SUMMARY

Some embodiments of the inventive subject matter provide an apparatus comprising an electrical assembly (e.g., a switching device, such as a contactor or circuit breaker) configured to be inserted into an enclosure. The electrical assembly includes at least one first contact configured to mate with at least one second contact disposed in an enclosure when the contactor assembly is inserted in the enclosure. The apparatus further includes an ejector mechanism including at least one pivoting member attached to the electrical assembly and configured to pivot about a point of attachment to the electrical assembly to apply a force to a surface of the enclosure and thereby cause movement of the electrical assembly within the enclosure. The movement of the electrical assembly caused by the ejector mechanism may disengage the at least one first contact from the at least one second contact.

In some embodiments, the electrical assembly may include a wheeled undercarriage. The at least one pivoting member may be attached to the undercarriage. The at least one pivoting member may be configured to pivot from a first position to a second position to engage the surface of the enclosure in response to a force applied thereto. The at least one pivoting member may be spring loaded to cause the at least one pivoting member to return to the first position when the force is removed.

In some embodiments, the at least one pivoting member may include first and second pivoting members attached to the undercarriage proximate first and second sides thereof and configured to engage the surface of the enclosure. The ejector mechanism may further include a bar attached to the first and second pivoting members proximate respective first and second ends of the bar. In some embodiments, the undercarriage may have a front edge that faces outward from the enclosure when the module is inserted in the enclosure, the first and second pivoting members may be attached to the undercarriage near the front edge, and the bar may be disposed outward of the front edge.

In some embodiments, the enclosure may include a floor-standing cabinet. The surface of the enclosure engaged by the first and second pivoting members may be located near a front edge of a floor-facing wall of the cabinet.

In further embodiments, the at least one second contact may include a conductive member extending toward the module in a direction of the movement of the module. The at least one first contact may include a stab configured to receive the conductive member when the electrical assembly is inserted in the enclosure.

Further embodiments of the inventive subject matter provide an apparatus including an electrical assembly and a wheeled undercarriage configured to support the electrical assembly and facilitate insertion of the electrical assembly into an enclosure. The apparatus further includes an ejector mechanism comprising at least one pivoting member attached to the undercarriage and configured to pivot about a point of attachment to the undercarriage to engage a surface of the enclosure and apply a force thereto. Application of force to the surface of the enclosure causes movement of the undercarriage and electrical assembly within the enclosure, and may be used to disengage contacts of the electrical assembly from bus bars or other contacts in the enclosure.

Still further embodiments provide an ejector for extracting an electrical assembly from an enclosure. The ejector includes at least one pivoting member configured to be attached to the electrical assembly. A force receiving member is coupled to the at least one pivoting member and configured to pivot the at least one pivoting member about a point of attachment to the electrical assembly to apply a force to a surface of the enclosure and thereby cause movement of the electrical assembly within the enclosure. The at least one pivoting member may be configured to be pivotally attached to a wheeled undercarriage that supports the electrical assembly.

DETAILED DESCRIPTION

Figure 1:
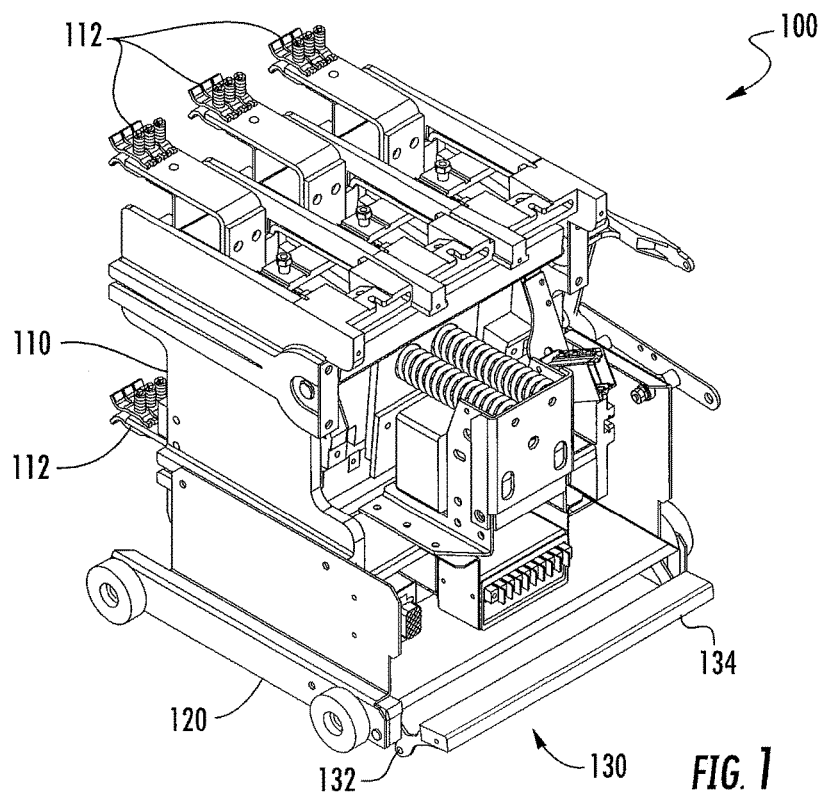
FIG. 1 is perspective view of a contactor assembly with an ejector mechanism according to some embodiments of the inventive subject matter.
Figure 2:
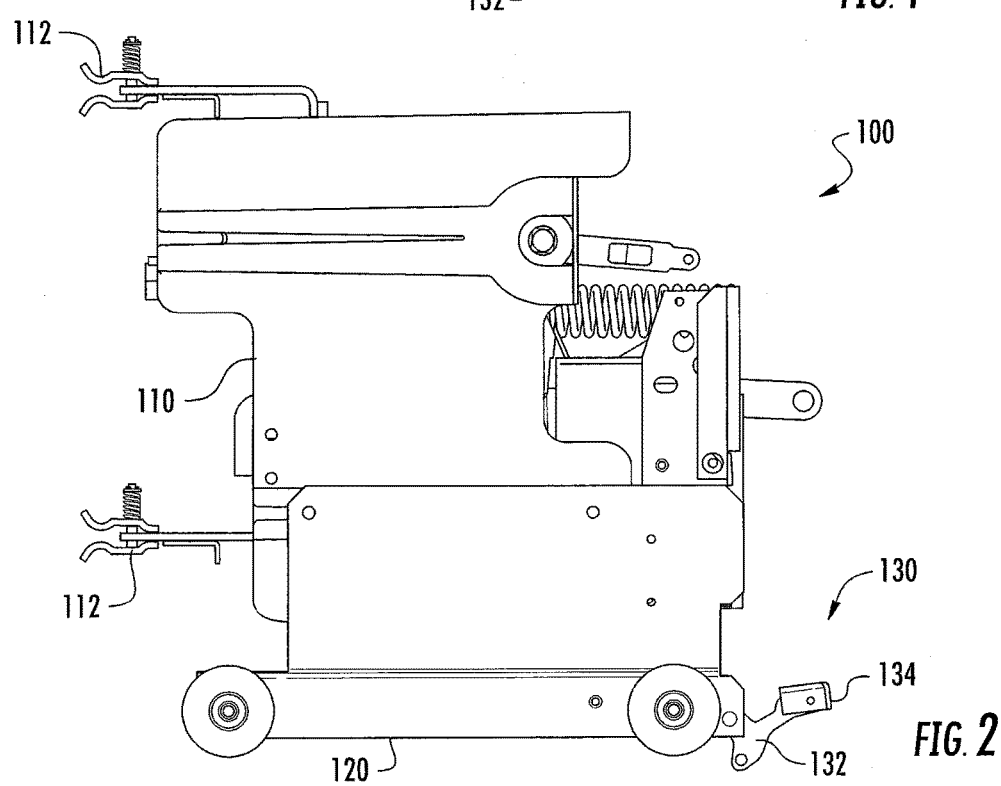
FIG. 2 is a side view of the contactor assembly of FIG. 1.
Figure 3:
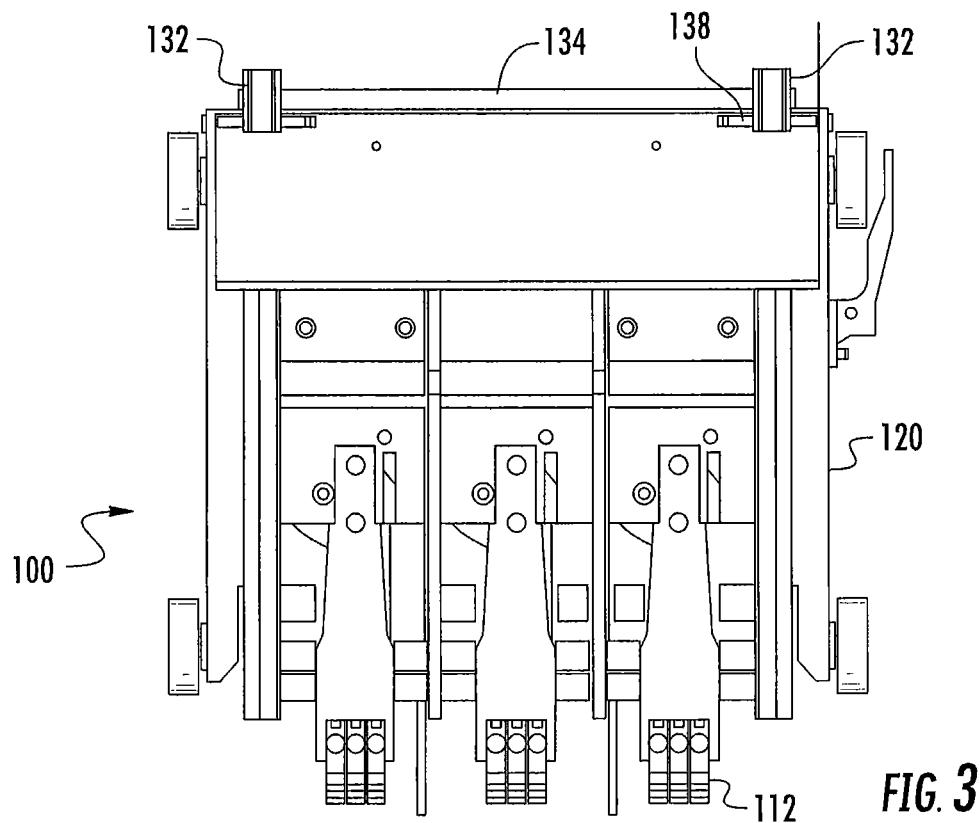
FIG. 3 is a bottom view of the contactor assembly of FIG. 1.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant, art and will not be interpreted in an idealized or overly formal sense unless expressly so defined herein.

Embodiments herein relate to ejector apparatus used to extract an electrical assembly from an enclosure. The electrical assembly may include, for example, a switching device, such as a contactor or circuit breaker, that is a component configured to be removably installed in a larger piece of equipment (e.g., motor starter or switchgear) using releasable contacts, such as conductor stabs and/or connectors. It will be appreciated, however, that embodiments of the inventive subject matter may apply to other types of electrical equipment that use removable components.

FIGS. 1-4 illustrate an apparatus 100 according to some embodiments of the inventive subject matter. The apparatus 100 includes a contactor assembly 110, which includes electrically conductive stabs 112 that are configured to engage bus bars of an enclosure in which the apparatus 100 is installed. The apparatus 100 further includes a wheeled undercarriage 120 which supports the contactor assembly 110 and facilitates insertion of the contactor assembly 110 into the enclosure and extraction of the contactor assembly 110 from the enclosure. In some embodiments, the undercarriage 120 may not include wheels, but may rather include rails or similar structures that facilitate movement of the undercarriage 120 in and out of the enclosure.

Figure 4:
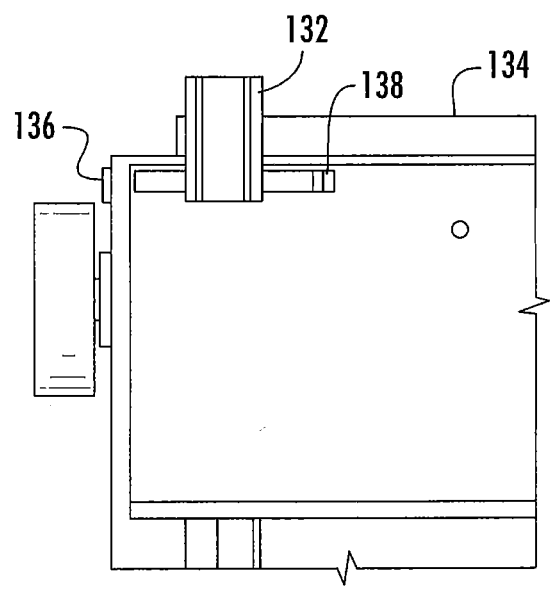
FIG. 4 is a detailed bottom view of the ejector mechanism of FIG. 1.

The apparatus 100 further includes an ejector mechanism 130 which is configured to aid in removal of the undercarriage 120 and the contactor assembly 110 from an enclosure. The ejector mechanism 130 includes first and second pivoting arm members 132, which are attached proximate first and second sides of the undercarriage 120. An elongate bar member 134 is attached to the pivoting arm members 132 proximate first and second ends of the bar member 134. As shown in FIG. 4, the pivoting arm members 132 may be spring loaded using a spring mechanism, here shown as including a spring 138 that is coaxially mounted on a pin or axle 136 about which the pivoting arm member 132 pivots. It will be appreciated that a variety of other types of mechanisms may be used to provide such spring loading of the pivoting arm members 132.

Figure 5:
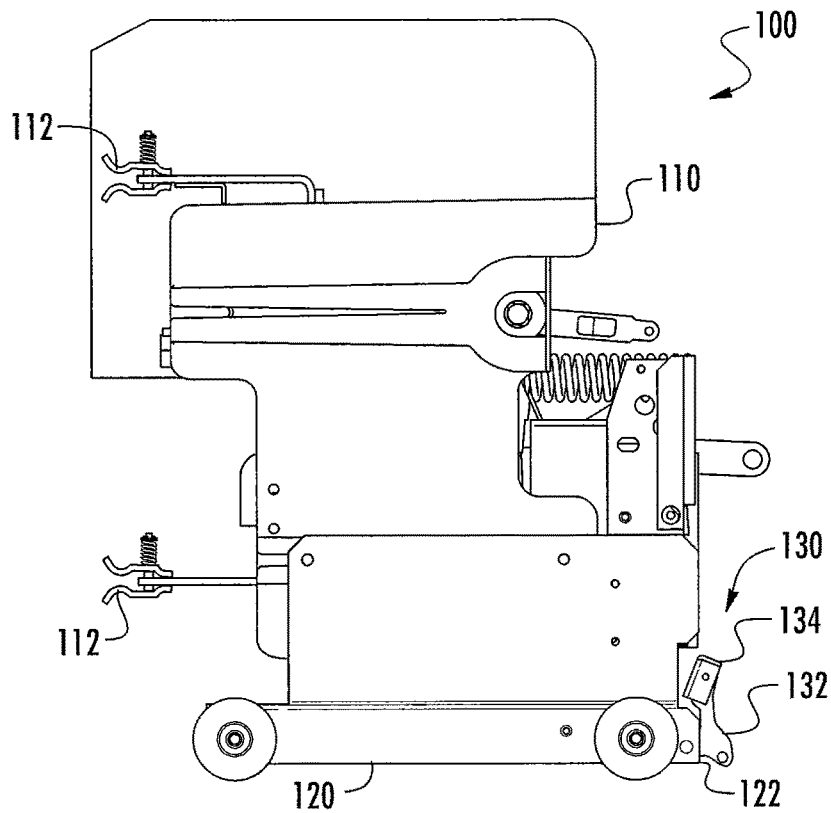
FIGS. 5 and 6 are side views of the contactor assembly of FIG. 1 illustrating stowed and deployed positions of the ejector mechanism, respectively.

Referring to FIG. 5, in a stowed position, the pivoting arm members 132 of the ejector mechanism 130 pivot upward such that the bar 134 rests above a front edge 122 of the undercarriage 120. The stowed positing may, for example, provide frontal clearance when the apparatus 100 is installed in an enclosure. The spring mechanism shown in FIG. 4 may force the ejector mechanism 130 to this stowed position in the absence of force applied to the bar 134.

Figure 6:
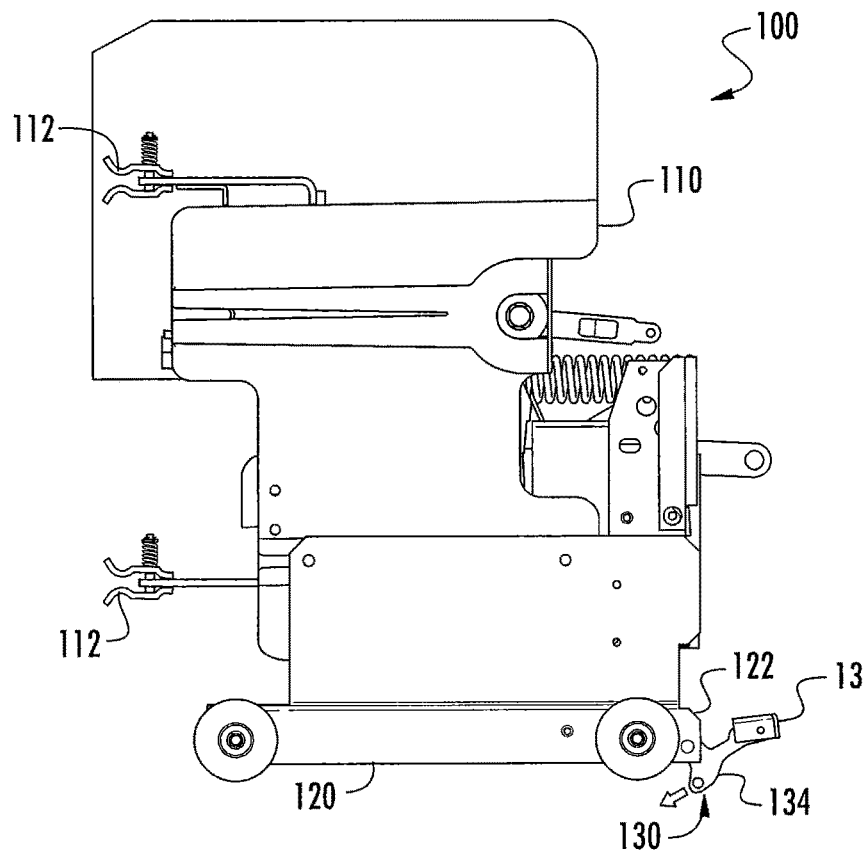

As shown in FIG. 6, a force applied to the bar 134 moves the ejector mechanism 130 to a deployed position wherein the arm members 132 of the ejector mechanism 130 pivot downward in response to the force applied to the bar 132. As explained below, the deployed pivoting arm members 132 may engage a surface of an enclosure in which the apparatus 100 is installed, such that application of additional force to the bar 134 applies an ejection force to the apparatus 100.

Figure 7:
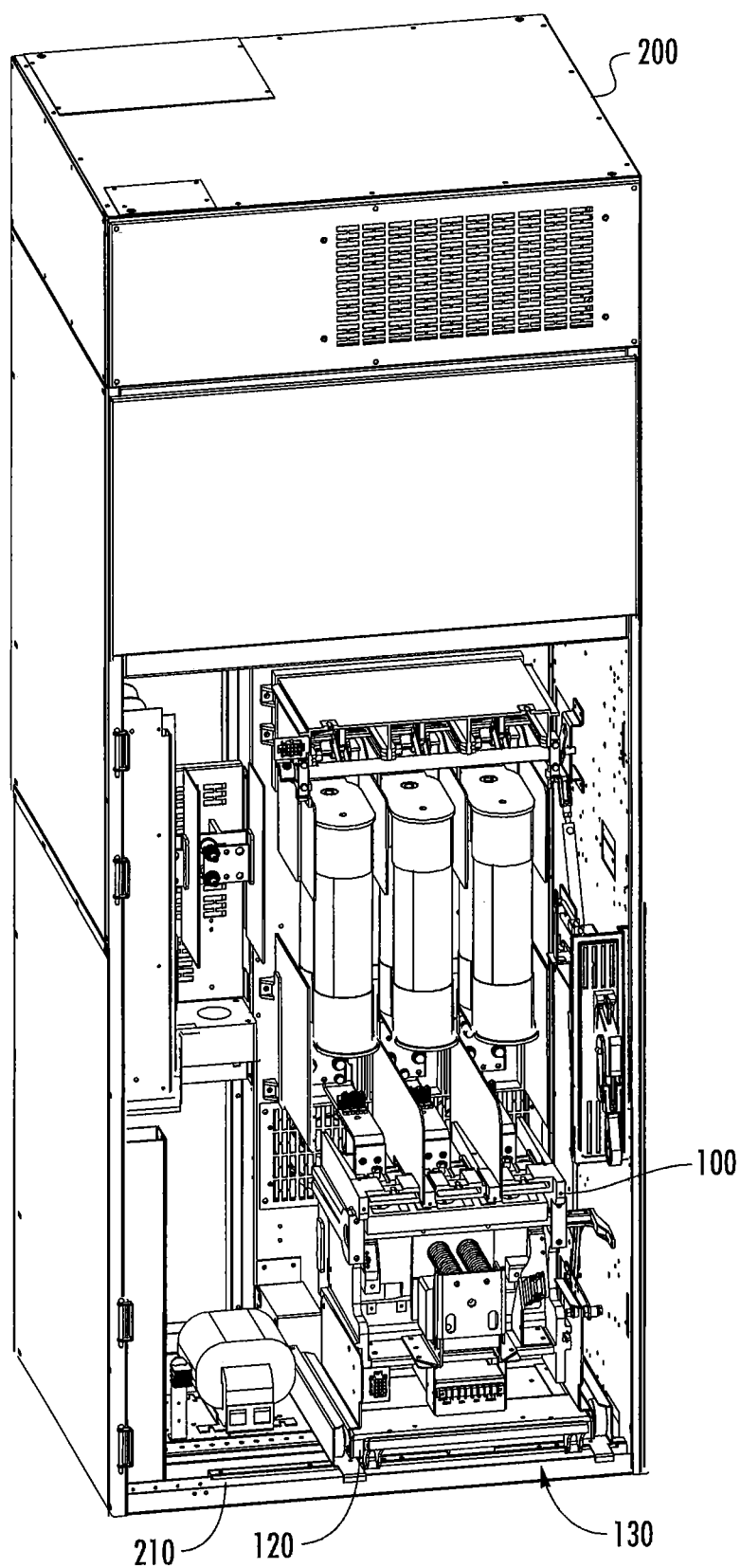
FIG. 7 is a perspective view of a motor starter enclosure with the contactor assembly of FIG. 1 installed therein.
Figure 8:
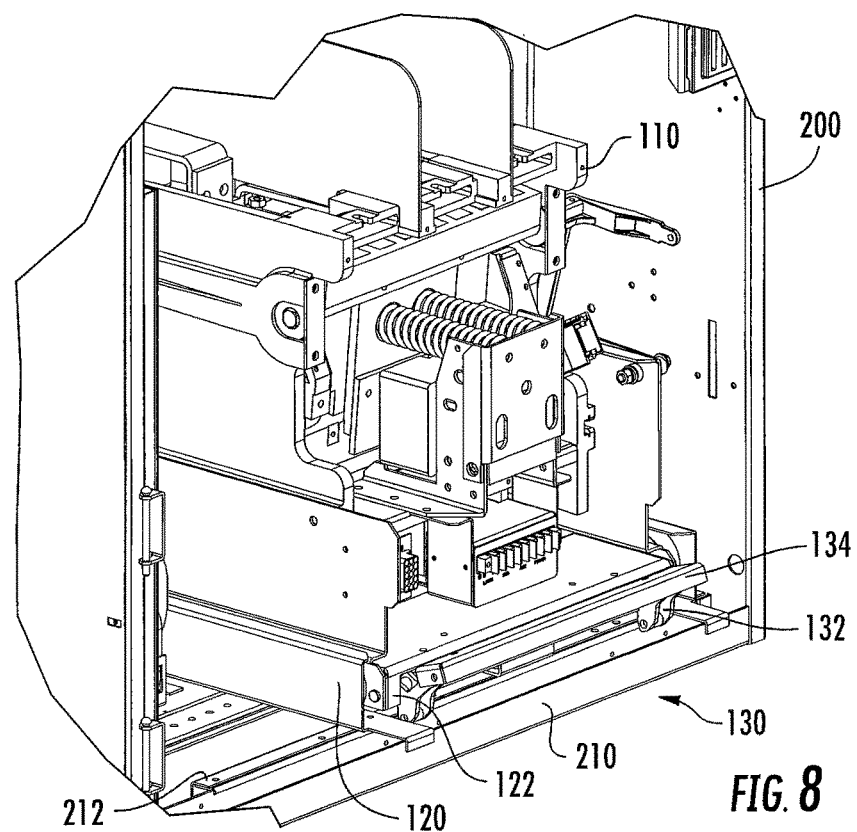
FIGS. 8 and 9 are detailed perspective views of the apparatus of FIG. 7.
Figure 9:
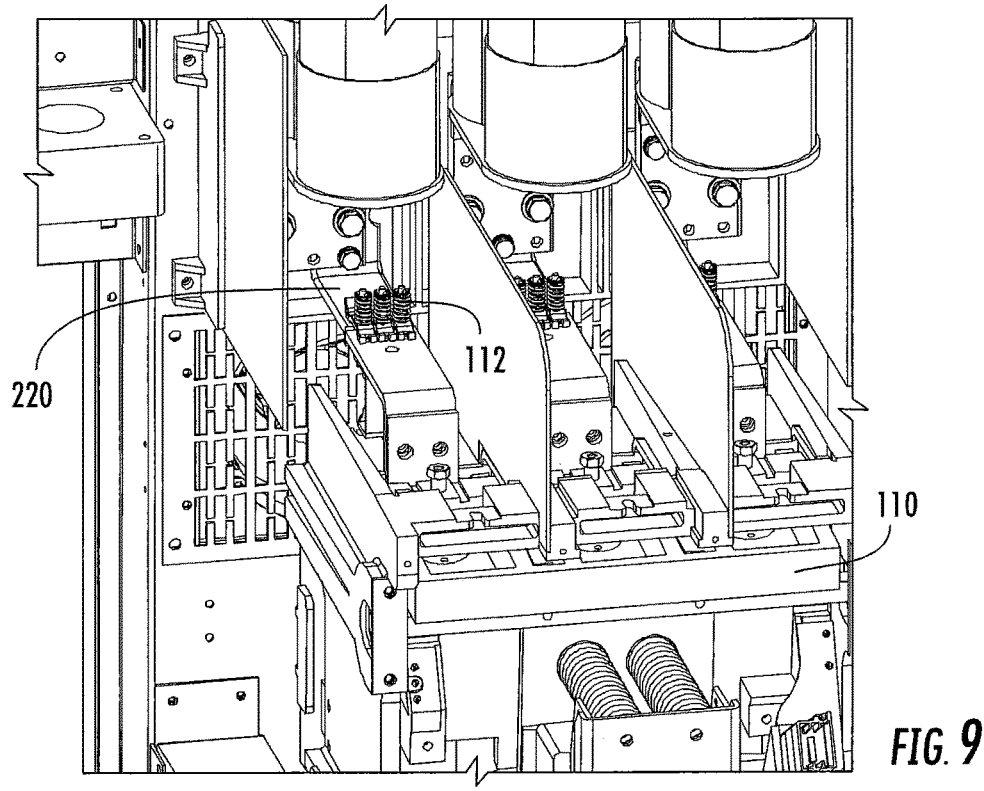

FIGS. 7-10 illustrate the apparatus 100 of FIGS. 1-6 operations thereof according to further embodiments. Referring to FIGS. 7-9, the apparatus 100 is installed in an enclosure 200, which may be, for example, an enclosure of a motor starter, motor drive, switchgear, or similar electrical apparatus. In FIGS. 7-9, the undercarriage 120 and contactor assembly 110 are fully inserted, with stabs 112 of the contactor assembly 110 engaging bus bars 220 mounted in the enclosure 200. The ejector mechanism 130 rests in a stowed position, with the arm members 132 pivoted upward such that the bar 134 is positioned above the front edge 122 of the undercarriage 120. As shown, the enclosure 200 is a floorstanding cabinet, and the ejector mechanism 130 is positioned near a floor-facing wall 210 of the enclosure 200 such that foot pressure may be applied to the bar 134 by an operator positioned in front of the enclosure 200. It will be appreciated, however, that other embodiments of the inventive subject matter may be configured for use with other types of enclosures and/or with different positioning of an ejector device such that, for example, ejection force may be applied by hand.

Figure 10:
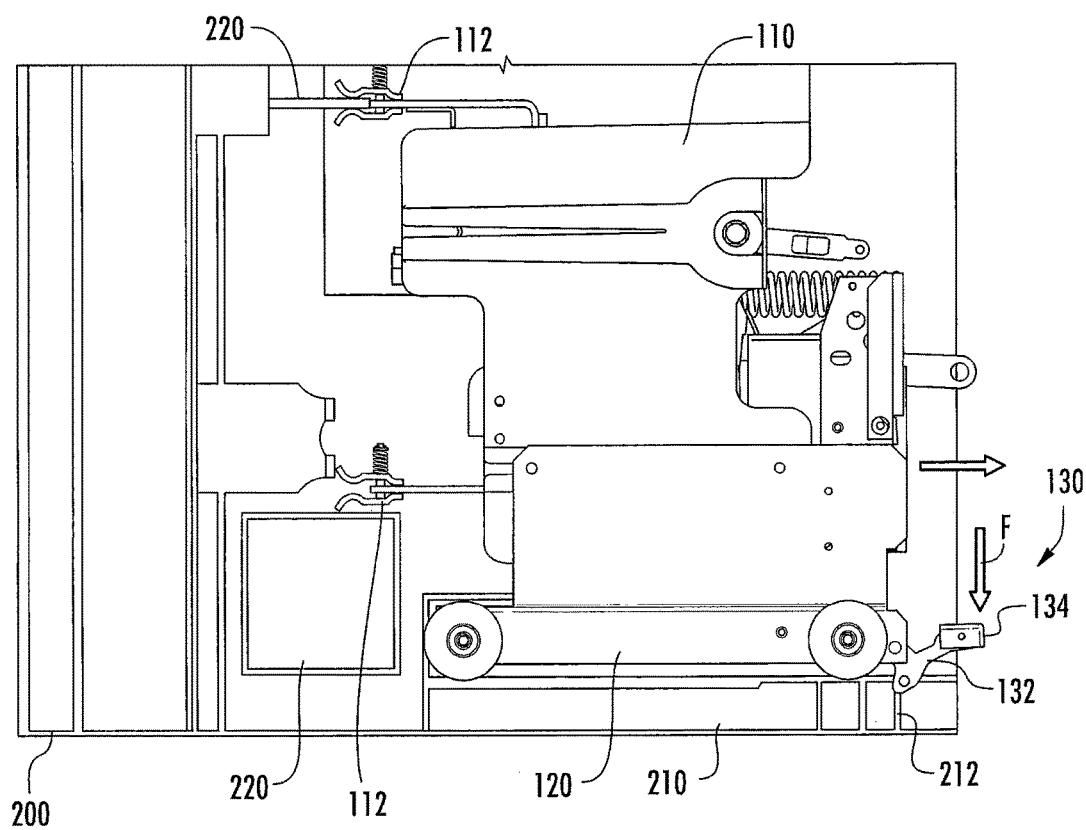
FIG. 10 is a side view illustrating operations of an ejector mechanism of the apparatus of FIG. 7.

As shown in FIG. 10, when a force F is applied to the bar 134 to deploy the ejector mechanism 130, the arm members 132 pivot downward to engage a surface of the enclosure 200, here a surface of a channel member 212. Further pressure (e.g., foot pressure) on the bar 134 can be used to force movement of the undercarriage 120 and the contactor assembly 110 in a direction outward from the enclosure 200, which can force disengagement of the contactor stabs 112 from the bus bars 220. This can facilitate extraction of the apparatus 100, which may be rolled out of the enclosure 200 once the contacts are disengaged. The ejector mechanism 130 thus eliminates a need to use a pry bar or other tool to disengage the contacts and extract the apparatus 100 from the enclosure 200.

It will be appreciated that further embodiments may vary from the example embodiments described above. For example, although the above embodiments illustrate an ejector mechanism for an assembly with a wheeled undercarriage, it will be appreciated that similar mechanisms may be used with sliding assemblies. While the illustrated example embodiments relate to a contactor assembly, further embodiments may be used with other types of electrical assemblies, such as other types of circuit breakers or switching devices configured to be inserted into an enclosure and mate with connectors, bus bars or similar structures within the enclosure.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An apparatus for installation in and removal from an enclosure having at least one first contact, the apparatus comprising:
    an electrical assembly having a wheeled undercarriage and configured to be rolled on a horizontal wall of the enclosure, the electrical assembly comprising at least one second contact configured to mate with the at least one first contact when the electrical assembly is rolled into the enclosure; and
    an ejector mechanism comprising first and second pivoting members attached to the undercarriage near respective first and second sides thereof and configured to apply a force to a surface of the enclosure and a bar attached to the first and second pivoting members near respective first and second ends of the bar, wherein pressure applied to the bar causes the first and second pivoting members to pivot and thereby cause movement of the electrical assembly by movement of the wheeled undercarriage within the enclosure.

2. The apparatus of claim 1, wherein movement of the electrical assembly caused by the ejector mechanism disengages the at least one second contact from the at least one first contact.

3. The apparatus of claim 1, wherein the first and second pivoting members are configured to pivot from a first position to a second position to engage the surface of the enclosure in response to a force applied thereto, and wherein the ejector mechanism is spring loaded to cause the first and second pivoting members to return to the first position when the force is removed.

4. The apparatus of claim 1, wherein the undercarriage has a front edge that faces outward from the enclosure when the electrical assembly is inserted in the enclosure, wherein the first and second pivoting members are attached to the undercarriage near the front edge, and wherein the bar is disposed outward of the front edge.

5. The apparatus of claim 4, wherein the enclosure comprises a floorstanding cabinet, wherein the surface of the enclosure engaged by the first and second pivoting members is located near a front edge of a floor-facing wall of the cabinet.

6. The apparatus of claim 1, wherein the at least one first contact comprises a conductive member extending toward the electrical assembly in a direction of the movement of the electrical assembly and wherein the at least one second contact comprises a stab configured to receive the conductive member when the electrical assembly is inserted in the enclosure.

7. The apparatus of claim 1, wherein the electrical assembly comprises a switching device.

8. The apparatus of claim 7, wherein the electrical assembly comprises a contactor assembly.

9. An apparatus for installation in and removal from an enclosure, the apparatus comprising:
    an electrical contactor;
    a wheeled undercarriage configured to support the electrical contactor and to roll along an upper surface of a horizontal wall of the enclosure to facilitate insertion of the electrical contactor into the enclosure; and
    an ejector mechanism comprising first and second pivoting members attached to the undercarriage and configured to engage the surface of the enclosure and a bar attached to the first and second pivoting members, wherein pressure applied to the bar causes the first and second pivoting members to pivot and apply a force to the surface of the enclosure and thereby cause movement of the undercarriage and the electrical contactor within the enclosure.

10. The apparatus of claim 9, wherein the first and second pivoting members are configured to pivot from a first position to a second position to engage the surface of the enclosure in response to a force applied thereto, and wherein the ejector mechanism is spring loaded to cause the first and second pivoting members to return to the first position when the force is removed.

11. The apparatus of claim 9, wherein the undercarriage has a front edge that faces outward from the enclosure when inserted in the enclosure, and wherein the first and second pivoting members are attached to the undercarriage near the front edge.

12. The apparatus of claim 9, wherein the electrical contactor comprises at least one first contact configured to engage at least one second contact within the enclosure when the electrical contactor and the undercarriage are inserted in the enclosure, and wherein movement of the undercarriage and the electrical contactor by the ejector mechanism disengages the at least one first contact from the at least one second contact.

13. An ejector for extracting an electrical assembly from an enclosure, the ejector comprising:
    first and second pivoting members configured to be attached to a wheeled undercarriage that supports the electrical assembly and facilitates rolling of the electrical assembly along an upper surface of a horizontal wall of the enclosure; and
    a force receiving member coupled to the first and second pivoting members and configured to pivot the first and second pivoting members about points of attachment to the wheeled undercarriage that supports the electrical assembly to apply a force to a surface of the enclosure and thereby cause movement of the electrical assembly within the enclosure.

14. The ejector of claim 13, wherein the force receiving member comprises a bar attached to the first and second pivoting members at respective first and second ends of the bar, and wherein pressure applied to the bar causes the first and second pivoting members to pivot.

15. The ejector of claim 14, wherein the undercarriage has a front edge that faces outward from the enclosure when inserted in the enclosure, and wherein the first and second pivoting members are configured to be attached to the undercarriage near the front edge.

16. The apparatus of claim 1, wherein the ejector mechanism is configured to be engaged by a foot of an operator to enable movement of the at least one pivoting member with the operator's body weight.

17. The apparatus of claim 11, wherein the ejector mechanism is configured for engagement of the bar by a foot of an operator to enable actuation of the ejector mechanism with the operator's body weight.

18. The ejector of claim 15, wherein the ejector is configured for engagement of the bar by a foot of an operator to enable actuation of the ejector with the operator's body weight.

* * * * *